US006853527B2

(12) United States Patent
Chu et al.

(10) Patent No.: US 6,853,527 B2
(45) Date of Patent: Feb. 8, 2005

(54) OVER-CURRENT PROTECTION APPARATUS FOR HIGH VOLTAGE

(75) Inventors: Edward Fu-Hua Chu, Taipei (TW); David Shau-Chew Wang, Taipei (TW); Yun-Ching Ma, Pingtung (TW)

(73) Assignee: Polytronics Technology Corporation, Hsinchu (TW)

( * ) Notice: Subject to any disclaimer, the term of this patent is extended or adjusted under 35 U.S.C. 154(b) by 121 days.

(21) Appl. No.: 10/284,898

(22) Filed: Oct. 31, 2002

(65) Prior Publication Data

US 2003/0086221 A1 May 8, 2003

(30) Foreign Application Priority Data

Nov. 1, 2001 (TW) ...................................... 90218697 U

(51) Int. Cl.[7] .................................................. H02H 3/08
(52) U.S. Cl. ................. 361/93.1; 338/22 R; 338/22 SD
(58) Field of Search ............................... 361/93.1, 93.9, 361/126, 106; 338/22, 23, 22 R, 22 SD

(56) References Cited

U.S. PATENT DOCUMENTS 4,924,074 A 5/1990 Fang et al.
4,967,176 A * 10/1990 Horsma et al. ........... 338/22 R
5,166,658 A * 11/1992 Fang et al. .................... 338/23
5,896,264 A * 4/1999 Bijlenga et al. ............ 361/106
6,606,023 B2 * 8/2003 Chiang et al. ............ 338/22 R

* cited by examiner

*Primary Examiner*—Brian Sircus
*Assistant Examiner*—James A Demakis
(74) *Attorney, Agent, or Firm*—Seyfarth Shaw LLP

(57) ABSTRACT

The present invention discloses an over-current protection apparatus for high voltage, which connects the ceramic current-sensing element and polymer current-sensing element in series to form a novel over-current protection apparatus. By the characteristic of the polymer current-sensing element having higher switching off speed, the invention first responds to the over-current by raising its temperature, and then the heat is thermally conducted through the adhesive layer to the ceramic current-sensing element, resulting in a voltage drop produced by the over-current partially or predominantly received by the ceramic current-sensing element. Thus, the over-current protection device of the invention not only can endure high voltage (>600V), but also will not exhibit a negative temperature coefficient phenomenon.

7 Claims, 6 Drawing Sheets

OVER-CURRENT PROTECTION APPARATUS FOR HIGH VOLTAGE

BACKGROUND OF THE INVENTION

1. Field of the Invention

The invention relates to an over-current protection apparatus, especially to an over-current protection apparatus for high voltage.

2. Description of Related Art

FIG. 1 is a conventional over-current protection apparatus 10, including an upper electrode foil 11, a lower electrode foil 12 and a current-sensing element 13. The upper electrode foil 11 and lower electrode foil 12 are metal conductive plates, respectively, and the current-sensing element 13 is formed by a conductive material with its resistance exhibiting a positive temperature coefficient (PTC) property. The conductive material with positive temperature coefficient refers to such material of which the resistance value is maintained at extremely low value under low temperature. However, when an over-current phenomenon occurs whereby the temperature is increased to a critical temperature, its resistance value will increase instantly thousands of times to a high resistance state, which can compensate for the over-current reversely and achieve the object of protecting circuit devices.

The current that the over-current protection apparatus can endure may be calculated by a general formula: V=IR. Therefore, to effectively protect the circuit devices and to endure a higher instant current, the requirement of high-voltage endurability for over-current protection apparatus becomes higher, particularly for the purpose of protecting the electronic communication product from a short circuit caused by an instant enormous amount of current produced by a lightning strike, which may even lead to an explosion.

Generally, the current-sensing element 13 of the over-current protection apparatus 10 may be formed by ceramic or conductive polymer materials. Although the ceramic current-sensing element has the characteristic of being able to endure high voltage (>600V) and may recover to its initial state. However, under a high or a low temperature condition, the resistance of the ceramic current-sensing element will appear a negative temperature coefficient phenomenon, and the resistance value of the element will reduce while the temperature rises, shown as curve A in FIG. 2. As a result, the current of the ceramic current-sensing element will increase with the rise of the temperature due to the negative temperature coefficient phenomenon, and that will result in a thermal run away phenomenon. When the temperature becomes out of control, the over-current protection apparatus may explode. Furthermore, since the ceramic current-sensing element is of lesser temperature sensitivity, it results in a longer time to trip. In addition, since the size of the over-current protection apparatus formed by ceramic material is so large that it is not suitable for the tendency of shrinking the size of electronic communication devices.

On the other hand, since the resistance value of the polymer current-sensing element formed by conductive polymer material does not have a negative temperature coefficient phenomenon and has a high switching off speed, it becomes the subject of intensive research and development at the present time. A diagram of the relationship between the resistance value thereof and the temperature is shown as curve B in FIG. 2. However, a normal polymer current-sensing element cannot endure high voltage (around 60V–250V). If the polymer current-sensing element needs to endure high voltage (>600V), then a lot of complicated processes are required. Furthermore, the polymer current-sensing element will lose its initial voltage after switching off and cannot restore to its initial state. Therefore, the polymer current-sensing element is not suitable for high voltage products. Table 1 shows a comparison on advantages and disadvantages between a ceramic current-sensing element and a polymer current-sensing element.

TABLE 1

| | Ceramic current-sensing element | Polymer current-sensing element |
|---|---|---|
| Advantage | (a) it endures a high voltage(>600 V);<br>(b) it can recover to an initial state after switching off; | (a) it will not produce negative temperature coefficient phenomenon;<br>(b) it has a higher switching off speed, and with a higher temperature sensitivity;<br>(c) the volume of the formed over-current protection apparatus is smaller. |
| Dis-advantage | (a) under a high or low temperature, the negative temperature coefficient phenomenon will occur;<br>(b) it has a lower temperature sensitivity, resulting a slower switching off speed;<br>(c) the volume of the formed over-current protection apparatus is larger | (a) it will not endure high voltage (its voltage endurability is generally around 60 V–250 V);<br>(b) after switching off, it will lose the intial voltage. |

To sum up, it is necessary to provide a solution addressing the advantage and disadvantage of the ceramic current-sensing element and the polymer current-sensing element, so as to produce an over-current protection apparatus which has a high voltage endurability and can avoid thermal run away phenomenon.

SUMMARY OF THE INVENTION

The first objective of the invention is to provide an over-current protection apparatus which can endure a high voltage (>600V), and the resistance value thereof will not exhibit a negative temperature coefficient phenomenon under the high or low temperature in order to prevent thermal run away phenomenon.

The second objective of the invention is to provide an over-current protection apparatus for high voltage, which has a greater temperature sensitivity and a higher switching off speed than those of conventional ceramic current-sensing elements.

To achieve the above-mentioned objectives and avoid the drawbacks of prior art, the invention provides an over-current protection apparatus which can endure high voltage, comprising a body, an upper electrode foil and a lower electrode foil. The body includes at least one polymer current-sensing element exhibiting a positive temperature coefficient behavior, at least one ceramic current-sensing element exhibiting a positive temperature coefficient behavior and at least one adhesive layer for connecting the polymer current-sensing element and the ceramic current-sensing element in series.

The invention connects the ceramic current-sensing element and polymer current-sensing element in series to form a novel over-current protection apparatus. By the characteristic of the polymer current-sensing element having higher switching off speed, the invention first responds to the over-current by raising its temperature, and then the heat is thermally conducted through the adhesive layer to the ceramic current-sensing element, resulting in a voltage drop produced by the over-current partially or predominantly received by the ceramic current-sensing element. Thus, the over-current protection device of the invention not only can endure high voltage (>600V), but also will not exhibit a negative temperature coefficient phenomenon.

Furthermore, a structure comprising at least one multi-layer polymer current-sensing element and at least one ceramic current-sensing element is an alternative for controlling the characteristic of resistance vs. temperature of the over-current protection apparatus. The transition temperatures and exposure dosages of neighboring polymer current-sensing elements can be well controlled to derive better high voltage endurance and device quality, e.g., the difference of the transition temperatures between neighboring polymer current-sensing elements is more than 5° C., and the difference of the exposure dosages between neighboring polymer current-sensing elements is between 0.1 to 10 Mrads (roentgen-absorbed dose).

BRIEF DESCRIPTION OF THE DRAWINGS

The present invention will be described according to the appended drawings in which.

DETAILED DESCRIPTION OF THE INVENTION

Figure 1:
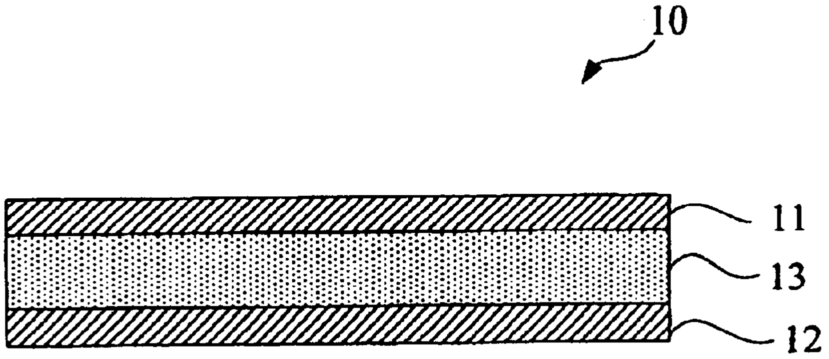
FIG. 1 (Prior Art)
FIG. 1 shows a cross-sectional diagram of a prior art over-current protection apparatus.
Figure 2:
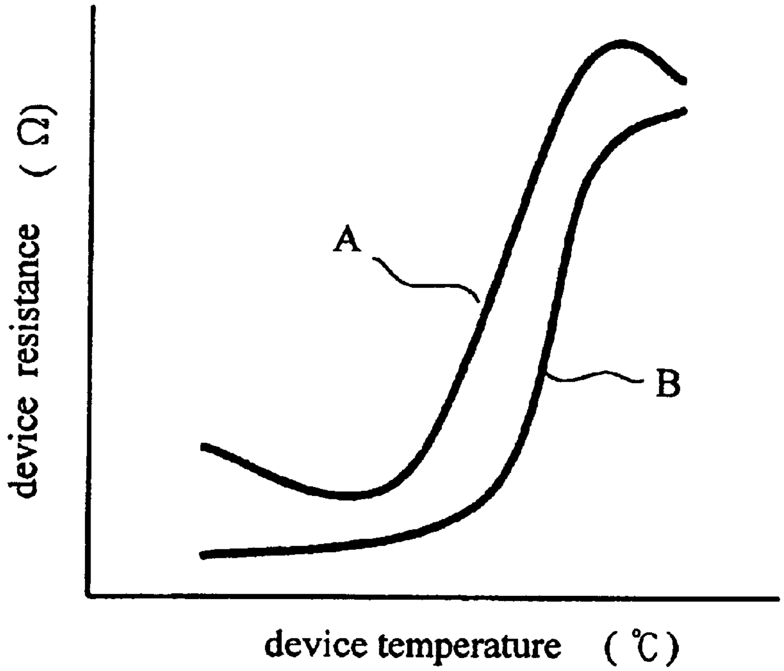
FIG. 2 (Prior Art)
FIG. 2 shows a resistance versus temperature diagram of prior art ceramic and polymer current-sensing elements.
Figure 3:
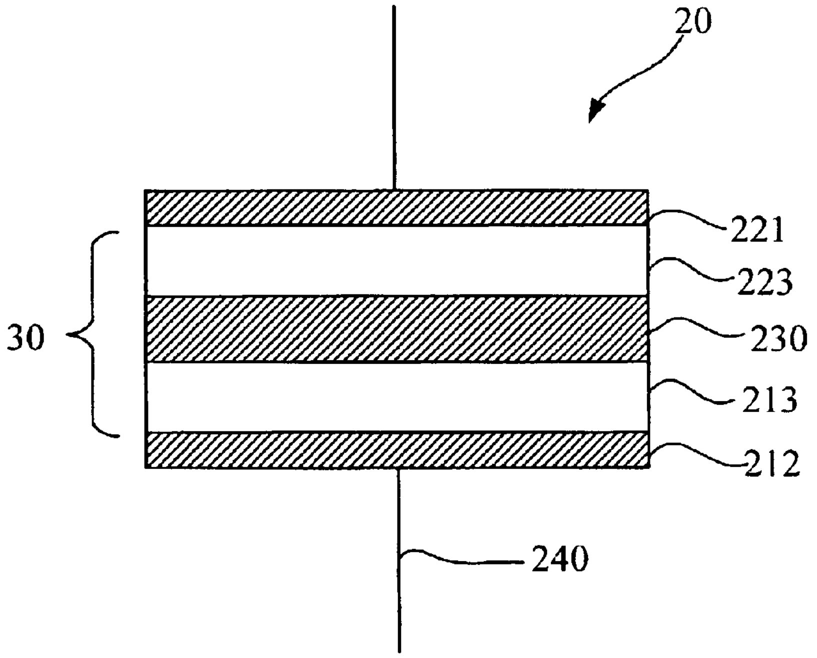
FIG. 3 shows a cross-sectional diagram of the over-current protection apparatus according to a first embodiment of the present invention.

FIG. 3 shows the cross-sectional diagram of the over-current protection apparatus 20 for high voltage according to the present invention. The over-current protection apparatus 20 includes an upper electrode foil 221, a lower electrode foil 212 and a body 30, wherein the body 30 includes a polymer current-sensing element 223, a ceramic current-sensing element 213 and an adhesive layer 230. The upper electrode foil 221, the lower electrode foil 212 and the adhesive layer 230 are all metal conductive materials, and the materials are selected from the group consisting of copper, nickel, platinum, gold and their alloy thereof. The polymer current-sensing element 223 is formed by a conductive polymer material with a positive temperature coefficient, and the ceramic current-sensing element 213 is formed by a ceramic material with a positive temperature coefficient. The polymer current-sensing element 223 and the ceramic current-sensing element 213 are connected in series by the adhesive layer 230, and the current is conducted into the over-current protection apparatus 20 through a conducting wire 240. Furthermore, in the invention, between the upper electrode foil 221 and lower electrode foil 212, there may be stacked with a plurality of polymer current-sensing elements 223 and ceramic current-sensing elements 213, which is not restricted by the invention.

The over-current protection apparatus 20 of the invention is to connect the ceramic current-sensing element 213 and the polymer current-sensing element 223 in series to attain the advantages of both elements simultaneously. That is, when an over-current condition occurs in the over-current protection apparatus 20 of the invention caused by an instant high current flow through the conducting wire 240, due to the higher temperature sensitivity and switching off speed of the polymer current-sensing element 223, the polymer current-sensing element 223 will respond to the instant high current in advance, so the temperature thereof will rise. Thereafter, the heat of the polymer current-sensing element 223 will be transferred through the adhesive layer 230 to the ceramic current-sensing element 213, which raises the temperature of the ceramic current-sensing element 213. However, due to the lower switching off speed of the ceramic current-sensing element 213, the ceramic current-sensing element 213 will not respond to the instant high current. Thus, during the initial period when the instant high current flows through, the resistance value of the ceramic current-sensing element 213 will not produce a negative temperature coefficient phenomenon due to the temperature rise (<100° C.). Thereafter, as the temperature of the over-current protection apparatus 20 rises gradually, the critical temperature (around 100° C.) of the ceramic current-sensing element 213 will be arrived in advance, so the voltage drop resulted from the instant high current will be received by the ceramic current-sensing element 213. Therefore, the over-current protection apparatus of the invention can maintain the high voltage enduring characteristics of the ceramic current-sensing element.

In other words, the over-current protection apparatus of the invention uses the advantage of the polymer current-sensing element 223 to compensate for the disadvantages of the ceramic current-sensing element 213, and the ceramic current-sensing element 213 still maintain its original advantage. Therefore, the over-current protection apparatus of the invention can endure high voltage (>600V), and will not produce a negative temperature coefficient phenomenon as in the prior art.

Figure 4A:
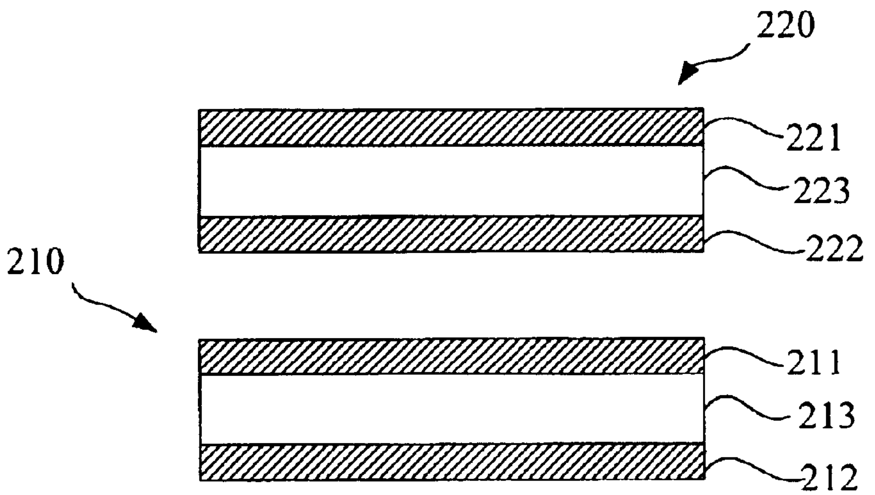
FIGS. 4*a* and 4*b* show a manufacturing flow of the present invention.
Figure 4B:
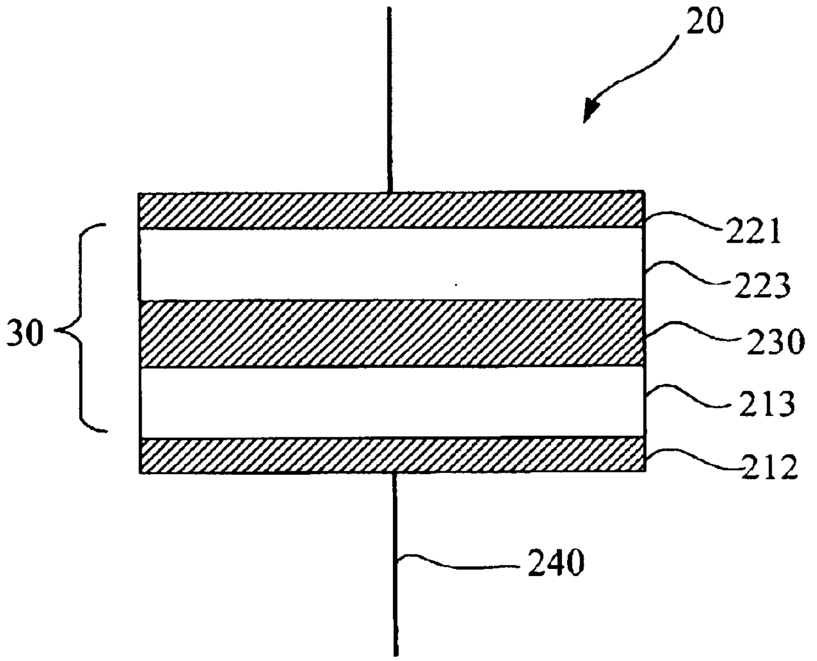

FIGS. 4*a* and 4*b* show a manufacturing method of a preferred embodiment of the present invention, which connects a conventional ceramic resistance element 210 and a conventional polymer resistance element 220 with a welding manner. As shown in FIG. 4*a*, the ceramic resistance element 210 includes an upper electrode foil 211, a lower electrode foil 212 and a ceramic current-sensing element 213, and the polymer resistance element 220 includes an upper electrode foil 221, a lower electrode foil 222 and a polymer current-sensing element 223. The lower electrode foil 222 of the polymer resistance element 220 and the upper electrode foil 211 of the ceramic resistance element 210 are welded to form an adhesive layer 230, whereby the ceramic current-sensing element 213 and polymer current-sensing element 223 are connected in a serial structure. As shown in FIG. 4*b*, the ceramic resistance element 210, the polymer resistance element 220 and the adhesive layer 230 forms a body 30. At last, a conducting wire 240 is used to conduct the current into the over-current protection apparatus 20. Thus, the ceramic current-sensing element 223 and polymer current-sensing element 213 can be conducted through the adhesive layer 230 to form an over-current protection apparatus 20 with a serial structure.

Figure 5:
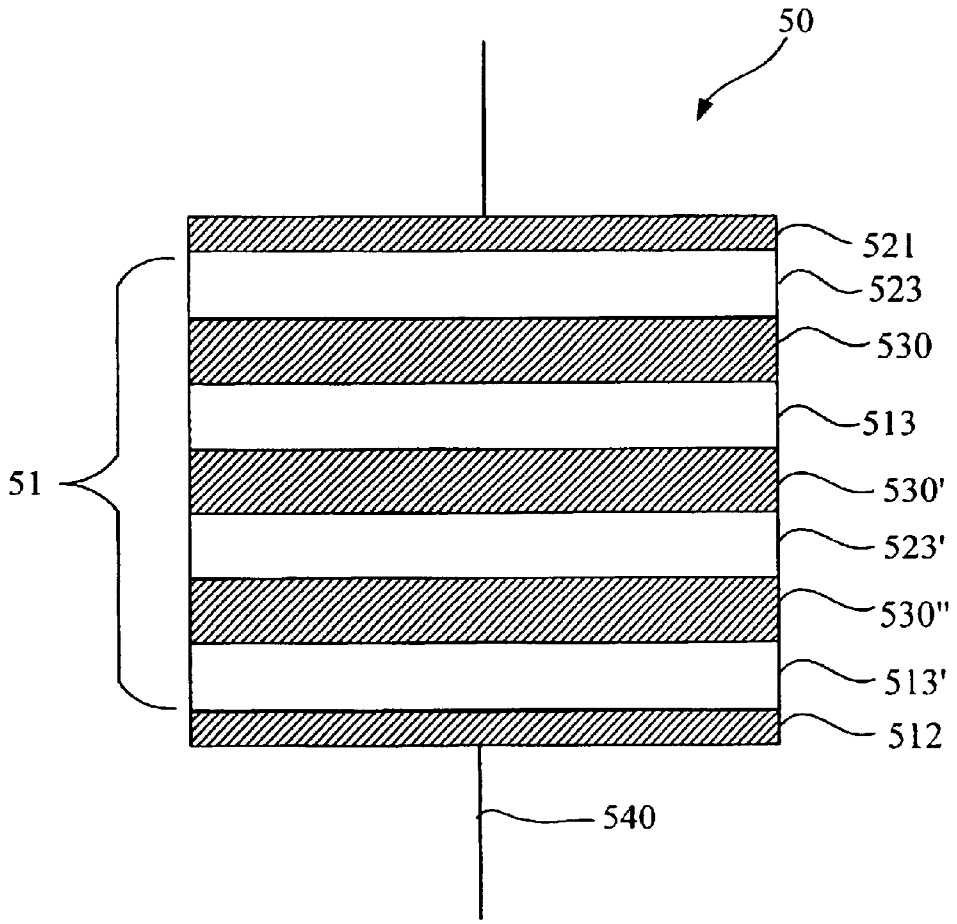
FIG. 5 shows a cross-sectional diagram of the over-current protection apparatus according to a second embodiment of the present invention.

FIG. 5 shows the cross-sectional diagram of the over-current protection apparatus 50 according to the second embodiment of the invention. Between the upper and lower electrode foils 521 and 512, a body 51 is formed, which includes a plurality of ceramic current-sensing elements 513, 513' and a plurality of polymer current-sensing elements 523, 523' interlaced in a multilayer structure. Furthermore, between a plurality of ceramic current-sensing elements 513, 513' and a plurality of polymer current-sensing elements 523, 523', a plurality of adhesive layers 530, 530' and 530" are welded respectively to form the serial structure.

Figure 6:
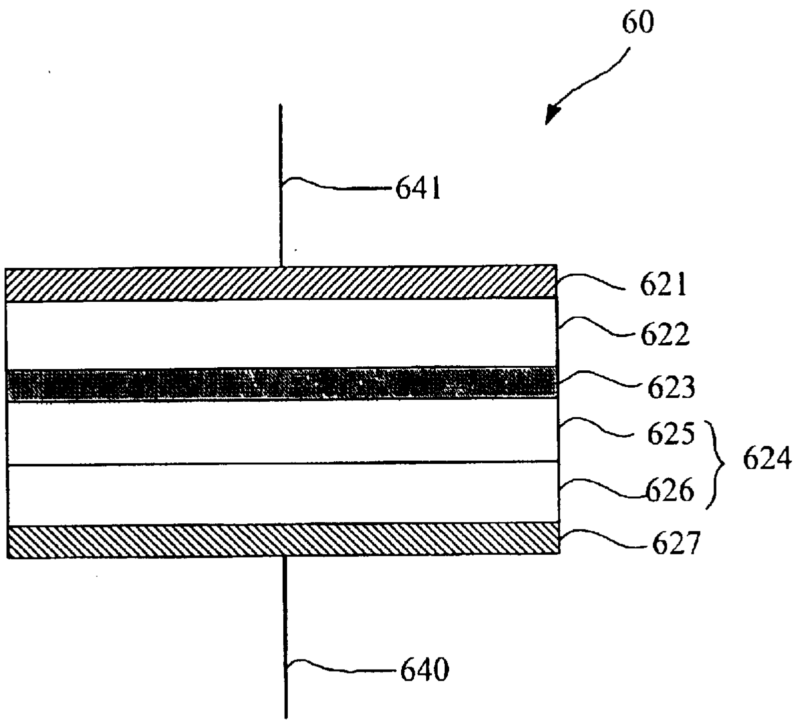
FIG. 6 shows a cross-sectional diagram of the over-current protection apparatus according to a third embodiment of the present invention.

FIG. 6 shows the over-current protection apparatus of the third embodiment in accordance with the present invention, which employs a structure including at least one ceramic current-sensing element and at least one multilayer polymer current-sensing element to endure high voltage, specifically more than 600 volts. Ideally, each of the ceramic current-sensing element and the multilayer polymer current-sensing element can endure at least 250 volts. The over-current protection apparatus 60 of the third embodiment comprises an upper electrode foil 621, a ceramic current-sensing element 622, an adhesive layer 623, a multilayer polymer current-sensing element 624 including a first polymer current-sensing element 625 and a second polymer current-sensing element 626, and the lower electrode foil 627, where the upper electrode foil 621 and lower electrode foil 627 are in connection with a conducting wire 641 and a conducting wire 640, respectively. Similarly, the ceramic current-sensing element 622 and the multilayer polymer current-sensing element 624 are connected in series as well to get rid of over-current damage. In addition, the characteristic of resistance vs. temperature of the over-current protection apparatus 60 can be adjusted by controlling different transition temperatures or exposure dosages of the first polymer current-sensing element 625 and the second polymer current-sensing element 626. The difference of the transition temperature between the first polymer current-sensing element 625 and the second polymer current-sensing element 626 is more than 5° C. If Cobalt 60 is selected for exposure, the difference of exposure dosage between the first polymer current-sensing element 625 and the second polymer current-sensing element 626 is between 0.1–10 Mrads.

The multilayer polymer current-sensing element is not limited to be constituted of two polymer current-sensing elements only. More than two polymer current-sensing elements can also be implemented if the transition temperatures or the exposure dosages of neighboring polymer current-sensing elements meet the above criteria.

The above-described embodiments of the present invention are intended to be illustrative only. Numerous alternative embodiments may be devised by those skilled in the art without departing from the scope of the following claims.

What is claimed is:

1. An over-current protection apparatus for high voltage, comprising:

a body, including:

(a) at least one multilayer polymer current-sensing element exhibiting a positive temperature coefficient behavior;

(b) at least one ceramic current-sensing element exhibiting a positive temperature coefficient behavior; and (c) at least one adhesive layer for connecting the at least one multilayer polymer current-sensing element and the at least one ceramic current-sensing element in series;

an upper electrode foil formed on a surface of the body; and a lower electrode foil formed on the other surface of the body opposite to the upper electrode foil, wherein the difference of transition temperatures between neighboring polymer current-sensing elements of the multilayer polymer current-sensing element is more than 50° C.

2. The over-current protection apparatus of claim 1, wherein the upper electrode foil and lower electrode foil are made of a conductive metal material.

3. The over-current protection apparatus of claim 2, wherein the material is selected from the group consisting of copper, nickel, platinum, gold and their alloy thereof.

4. The over-current protection apparatus of claim 1, wherein the adhesive layer is made of a conductive metal material.

5. The over-current protection apparatus of claim 4, wherein the material is selected from the group consisting of copper, nickel, platinum, gold and their alloy thereof.

6. The over-current protection apparatus of claim 1, wherein the multilayer polymer current-sensing element is in exposure of Cobalt 60.

7. The over-current protection apparatus of claim 6, wherein the difference of exposure dosages between neighboring polymer sensing-elements of the multilayer polymer current-sensing element is between 0.1 to 10 Mrads.

* * * * *

UNITED STATES PATENT AND TRADEMARK OFFICE

CERTIFICATE OF CORRECTION

PATENT NO. : 6,835,527 B2 | Page 1 of 1

DATED : February 8, 2005

INVENTOR(S) : Edward Fu-Hua Chu et al.

It is certified that error appears in the above-identified patent and that said Letters Patent is hereby corrected as shown below:

<u>Column 6,</u>
Line 26, "50°C" should be -- 5°C --.

Signed and Sealed this

Twenty-fourth Day of May, 2005

JON W. DUDAS
*Director of the United States Patent and Trademark Office*

UNITED STATES PATENT AND TRADEMARK OFFICE

CERTIFICATE OF CORRECTION

PATENT NO. : 6,853,527 B2
DATED : February 8, 2005
INVENTOR(S) : Edward Fu-Hua Chu et al.

It is certified that error appears in the above-identified patent and that said Letters Patent is hereby corrected as shown below:

Column 6,
Line 26, "50°C" should be -- 5°C --.

Signed and Sealed this

Twenty-third Day of August, 2005

JON W. DUDAS
*Director of the United States Patent and Trademark Office*